US007089417B2

(12) United States Patent
Wack et al.

(10) Patent No.: US 7,089,417 B2
(45) Date of Patent: Aug. 8, 2006

(54) CRYPTOGRAPHIC INFORMATION AND FLOW CONTROL

(75) Inventors: C. Jay Wack, Clarksburg, MD (US); Edward M. Scheidt, McLean, VA (US); Jeffrey K. Morris, Arlington, VA (US)

(73) Assignee: TECSEC, Inc., Vienna, VA (US)

( * ) Notice: Subject to any disclaimer, the term of this patent is extended or adjusted under 35 U.S.C. 154(b) by 428 days.

(21) Appl. No.: 10/715,938

(22) Filed: Nov. 18, 2003

(65) Prior Publication Data
US 2004/0101139 A1   May 27, 2004

Related U.S. Application Data

(63) Continuation of application No. 09/418,806, filed on Oct. 15, 1999, now Pat. No. 6,684,330.

(60) Provisional application No. 60/104,512, filed on Oct. 16, 1998.

(51) Int. Cl.
*H04L 9/14* (2006.01)

(52) U.S. Cl. .................. 713/162; 713/160; 713/161; 713/169; 380/44; 380/46; 380/283; 380/284; 726/5; 726/28

(58) Field of Classification Search ............... 713/160, 713/161, 162, 169; 380/44, 46, 283, 284; 726/5, 28
See application file for complete search history.

(56) References Cited

U.S. PATENT DOCUMENTS

| 4,145,567 | A | | 3/1979 | Ehrat .......................... 178/22 |
|---|---|---|---|---|
| 4,200,770 | A | | 4/1980 | Hellman et al. ............... 178/22 |
| 4,218,582 | A | | 8/1980 | Hellman et al. ............... 178/22 |
| 4,864,616 | A | | 9/1989 | Pond et al. .................... 380/25 |
| 5,268,962 | A | * | 12/1993 | Abadi et al. ................. 713/161 |
| 5,276,738 | A | | 1/1994 | Hirsch .......................... 380/46 |
| 5,499,297 | A | | 3/1996 | Boebert ........................ 380/23 |
| 5,541,994 | A | | 7/1996 | Tomko et al. ................. 380/30 |
| 5,557,678 | A | | 9/1996 | Ganesan ....................... 380/21 |
| 5,627,894 | A | | 5/1997 | Albert et al. .................. 380/46 |
| 5,694,472 | A | | 12/1997 | Johnson et al. ............... 380/25 |
| 5,696,827 | A | * | 12/1997 | Brands ......................... 380/30 |
| 5,710,815 | A | | 1/1998 | Ming et al. ................... 380/20 |
| 5,737,419 | A | * | 4/1998 | Ganesan ..................... 713/169 |
| 5,751,808 | A | | 5/1998 | Anshel et al. ................. 380/27 |
| 5,761,305 | A | | 6/1998 | Vanstone et al. ............. 380/21 |
| 5,778,069 | A | | 7/1998 | Thomlinson et al. ......... 380/25 |
| 5,815,573 | A | | 9/1998 | Johnson et al. ............... 380/28 |
| 5,857,025 | A | | 1/1999 | Anderson et al. ............. 380/28 |
| 5,966,449 | A | * | 10/1999 | Iwamura et al. ............. 380/44 |
| 6,041,123 | A | * | 3/2000 | Colvin, Sr. .................. 713/153 |
| 6,226,751 | B1 | * | 5/2001 | Arrow et al. ................ 713/201 |
| 6,327,660 | B1 | * | 12/2001 | Patel ........................... 713/193 |
| 6,341,164 | B1 | * | 1/2002 | Dilkie et al. ................. 380/278 |

OTHER PUBLICATIONS

Microsoft Press Computer Dictionary, 1997, Third Edition, p. 158.*

* cited by examiner

*Primary Examiner*—Justin T. Darrow
(74) *Attorney, Agent, or Firm*—IP Strategies

(57) ABSTRACT

A method of providing cryptographic information and flow control includes first determining a target domain from an IP address. An organization policy is looked up from a credential store, and an algorithm and credentials specified for the target domain are looked up in a domain-credential map. Any further credentials that are provided and that are permitted by the organizational policy are added. A working key is then generated, and information is received in the form of a receive packet. Any packet header is stripped from the receive packet and the remaining data is encrypted. Key splits are retrieved from the credential store, and are combined to form a key-encrypting key. The working key is the encrypted with the key-encrypting key, and a CKM header is encrypted. The encrypted CKM header is concatenated to the beginning of the encrypted data to form transmit data, and the packet header and the transmit data are concatenated to form a transmit packet. The transmit packet is then provided to a network interface card for transmission on a network.

19 Claims, No Drawings

CRYPTOGRAPHIC INFORMATION AND FLOW CONTROL

This is a continuation of U.S. patent application Ser. No. 09/418,806, which was filed on Oct. 15, 1999 now U.S. Pat. No. 6,684,330 and which is incorporated herein in its entirety.

Priority under 35 U.S.C. §119(e)(1) is hereby claimed of U.S. provisional patent application Ser. No. 60/104,512, filed on Oct. 16, 1998.

This document incorporates by this reference, the entire disclosure of the following U.S. patent applications: Ser. No. 08/974,843, filed Nov. 20, 1997; Ser. No. 09/108,312, filed Jul. 1, 1998; Ser. No. 09/023,672, filed Feb. 13, 1998; and 60/098,915, filed Sep. 1, 1998.

FIELD OF THE INVENTION

The present invention relates to systems for providing data security on a network. In particular, the present invention relates to a key management system using a network interface card to provide control of information and flow on a network.

BACKGROUND OF THE INVENTION

In an environment in which methods of transmitting information are increasingly public and intertwined, protecting sensitive information has become critically important. Insuring confidentiality, privacy, and restricted access are primary concerns of both government and private organizations. Traditional methods of providing sufficient levels of security lag behind current needs and threaten to block implementation of new information and communication technologies. Furthermore, many methods currently being offered suffer in one or more of the following areas:

Require extremely large investments. While several secure network gateways, interface and VPN devices are available, most are so costly as to exclude them from consideration in all but the most critical applications. It is not uncommon to find devices that would be required at every workstation at a cost of several thousand (and, at times, several tens of thousands of) dollars per unit. Furthermore, most of these devices provide single functionality and must be physically removed or detached for any reconfiguration (providing little "bang for the buck").

Inflexibility. Many current devices provide little if any flexibility in their use, while others offer some flexibility but with varying degrees of difficulty. VPNs either cannot be "re-keyed" to multiple, secure "conferences" or "logical networks", or can only be re-keyed by physically removing or detaching the device. Very few if any provide the ability for a single user or workstation to communicate with multiple VPNs or to communicate through both secure and unsecure channels. Cryptographic algorithms are often pre-loaded and typically cannot be selected dynamically.

Limited Functionality. Most current devices are intended to provide one or two functions, often for a single application. A device provides data privacy but not access control or data separation. Some provide user authentication but cannot verify the authenticity of data received or of the apparent sender, while others do the opposite. Many work only in a Type 1 classified environment, while others can be used only for sensitive but unsecure information.

Extensive Network Infrastructure. Many (if not most) designs for protecting data-in-transit focus on securing the channels of communication rather than the information being communicated. These types of designs require, a priori, that all points between the originator and intended recipient of the data maintain the secure channel. Therefore, specialized hardware and/or software is required throughout the network, presenting extensive maintenance challenges and considerable cost. Furthermore, since these designs introduce multiple points of potential failure, considerably more hardware and maintenance efforts are needed for secondary backup systems, further complicating network design and inflating both initial and ongoing costs.

Extensive Key Management Infrastructure. Many designs require server-based certificate, user, and/or key directories and complicated systems for distribution, replication, authentication, and verification. Such systems are not only complicated to design and implement, but are suspect to load and performance requirements.

If government and commercial organizations are going to be able to exploit the increasingly open networks and technologies, better methods of protecting the information sent through these networks are clearly needed. Although it is not believed that any one technology or any one application of technologies will provide a single complete solution for protecting data in transit, the use of a Constructive Key Management (CKM) system (see U.S. patent application Ser. No. 09/023,672) on a Network Interface Card (NIC) is capable of solving many of the existing challenges for a considerable number of potential applications.

SUMMARY OF THE INVENTION

It is an objective of the present invention to provide a CKM-enabled network interface card with all of the following capabilities:

Protects the privacy of any or all information being sent from a workstation through a network;

Is compatible with the most frequently-used hardware and operating systems;

Restricts access to transmitted data to receivers who share specified role-based credentials (applies implicitly through a system of defaults, or explicitly by the user or through an API);

Is designed to be usable by the maximum number of users for any data transmitted over the most widely installed network types;

Enforces security policies established by the user's organization;

Operates in a mode that is transparent to users, but which may still be controlled by users (within limits established by security administrators);

Operates in a manner that does not disrupt the data stream and which does not alter performance significantly;

Provides the ability to establish Multiple Dynamic Virtual Private LANs;

Is client-based, requiring no centralized authentication;

Provides key-management and distribution resources that are distributable and that require no run-time server access;

Provides key-recoverability to security administrators in the organization;

Allows organizational control and user/application selection of cryptographic algorithms;

Provides promiscuous mode operations for use by network security monitors and auditors;

Has a production cost that is affordable to most government, institutional, and commercial organizations;

May be produced in both unclassified and classified (Type 1) versions while maintaining data compatibility; and Provides a clear and simple path for future development and integration with emerging technologies;

It is further an objective of the present invention to provide the integration of CKM into NIC hardware, with a major focus on functional designs within the CKM key management and cryptographic systems.

Although the methods of applying CKM functionality to a NIC application are discussed at length, CKM key management, distribution, and cryptography are not discussed directly; these topics are discussed in detail in the incorporated references listed above. Likewise, issues regarding user authentication, login, session expiration, and token and SmartCard storage are discussed in these references.

DETAILED DESCRIPTION OF THE PRESENT IVNENTION

The development of a CKM-enabled NIC will be implemented through three major components: a CKM-enable encryption processor chip, a NIC card integrating the chip, and software device drivers.

General Operations

The card will work in a manner such that all data sent to it, both during transmission and reception, will be directed to the encryption processor chip prior to leaving the card. That is, data being sent from the workstation will be processed for possible encryption prior to be being released onto the network, and data being received will be directed to the processor for possible decryption prior to be forwarded to other OS components.

Encryption

For data being sent from the workstation, the processor (with support from the device drivers) will perform the following tasks:

1. Determine the target Domain from the IP address and (when needed) DNS services. The domain address should be retained so that successive contacts to the same IP will be treated as a continuous virtual "connection" (avoiding repetition of steps 2–4 as well as possible interruption of user activity). As soon as a new domain address is provided, the virtual connection is broken and all procedures are again used.
2. Look up organizational policy from the user's Credential Store.
3. Look up the algorithm and credentials specified for the target domain in the local Domain-Credential Map (see Domain Credential Mapping, below). If no link is found, follow procedures specified by policy to either terminate transmission or to retrieve an algorithm and credential from the user (see Domain Policy, below).
4. If further credentials have been provided by either the user or an application, and if policy permits, add these to those found in the Map.
5. Generate a random number to be used as a working key.
6. Strip the header from the first packet, encrypt the data, retrieve the key splits from the user's Credential Store for specified credentials, combine the key splits to build the key-encrypting key, encrypting key, encrypt the working key, encrypt the CKM header, concatenate the CKM header to the beginning of the data, and concatenate the packet header and data.
7. For each additional packet, strip the packet header, encrypt the data with the working key, and re-attach the packet header to the encrypted data.
8. Release the data back to the NIC for transmission.

Decryption

When data addressed to the workstation is received from the network, the processor performs the following tasks:

1. Strip the IP packet header from the data in the first packet.
2. If a CKM header is found, strip and decrypt it. Otherwise, re-attach the first packet header and release the packet for normal reception operations.
3. Retrieve key splits from the user's Credential Store for all credentials specified in the CKM header. If all splits cannot be found, or if the user is not authorized for the algorithm specified, destroy packets and return an error code.
4. Combine splits to build the key-encrypting key. Decrypt the working key.
5. Use the decrypted working key to decrypt the remaining data.
6. Re-attach the IP header to the decrypted data.
7. Release to the NIC for normal reception operations.
8. Repeat steps 5–7 for all subsequent packets.

Infosec Rather Than ComSec

Note that this design encrypts and decrypts only the informational portion of the data, not the IP packet headers. Although this method requires a very small amount of additional time than systems that "secure the channel" (by encrypting all bits going through the pipe), it avoids numerous problems and potential pitfalls of channel encryption. Instead of requiring specialized hardware and software at all points in the channel, only the point of origin (the sender) and the point of termination (the receiver) must have CKM-enabled devices. All points between are able to read the packet headers, which is the only thing they need or should be given access to. In essence, the CKM-NIC focuses on Information Security rather than on Communication Security.

Although the packet header, itself, provides some amount of contextual information about its related encrypted data, the IP addresses of the sender and intended receiver are in the clear. When protection of this type of information is critical, combining CKM-NIC encryption with some form of channel or pipe encryption provides the most thorough solution.

CKM-Enabled Encryption Processor

CKM may be integrated into a NIC via a hardware encryption processor, such as Motorola's AIM chip. All functions related to working (session) key generation and cryptographic processes will be implemented in the chip. Other support functions, such as retrieving credentials and policies, will be kept offline and implemented through a software driver run under the main PC operating system.

The CKM-enabled encryption processor used in the NIC design preferably will include multiple algorithms including several modes of DES and Triple-DES. Additionally, the chip preferably will implement both a block mode and a stream mode of a proprietary $P^2$ algorithm (see U.S. patent application Ser. No. 09/108,312). Algorithms will be selectable at the time of encryption through a software driver.

In a preferred embodiment, the CKM-enabled encryption processor meets the following general requirements:

performs all key generation and cryptographic transformations within private memory space;

performs all key generation and cryptographic transformations in a private co-processor, optimized for these manipulations;

provides non-volatile storage space for no fewer than six cryptographic algorithms;

provides the capability to select an algorithm prior to initializing encryption vectors;

Apart from its integration in NIC or other devices, is NSA certifiable for Type 1 classified use;

is compliant with FIPS 140-1, ANSI 9.17 and 9.69, and other relevant standards; and permits integration into either classified or unclassified hardware and software environments.

The CKM-enabled encryption processor may be produced as a single chip meeting a form-factor suitable for integration on standard, full length PCI cards. Alternatively, smaller, low-voltage packages may be produced.

The CKM-Enabled NIC

The CKM-enabled NIC integrates the CKM-enabled encryption processor with largely standard NIC components. For example, the card may be released for Intel platform PCI-busses.

Preferably, the card supports Ethernet networks, although an ATM card is contemplated also.

The CKM-Enabled NIC is suitable for use in unclassified environments, supporting the majority of potential users. This design allows the production of an encrypting NIC card at a unit cost within the same order of magnitude as traditional NIC cards. A Type 1 card will implement red-black separation and other requirements necessary for NSA Type 1 certification. Provided that the sender selects an unclassified algorithm, data between the classified and unclassified NICs is compatible.

Device Drivers

The device driver system is preferably implemented as a pair of drivers. The first, here called the NIC driver, will provide operating system, support, and interface functions to the NIC. The NIC driver is functionally similar to traditional NIC drivers with the major exception that it will insure proper data flow to and from the CKM-Enabled cryptographic processor. The second driver, here called the CKM Driver, will provide the primary interfaces between the cryptographic process and the CKM system, software applications, and, where needed, the user. Most features described in the next section, Functional Integration of CKM in a NIC Application, will be implemented or supported within the CKM driver.

Functional Integration of CKM in a NIC Application

A CKM-Enabled NIC allows near complete transparency of cryptographic processes and requirements to both the end user and to higher level applications. The system does not require modifications to existing network protocols, socket layers, or front-end applications. It also imposes no run-time requirements on users and has minimal setup needs.

Both users and applications at all levels may exploit CKM's capabilities as desired and as permitted by organizational policy. Users are able, for example, to hone the selection of credentials to narrowly targeted workgroups. Similarly, application developers may want to customize automated credential and algorithm selection to their specific needs. Therefore, at the same time that the NIC provides near total transparency, it supports near full control capability.

The CKM-enabled NIC also aims for acceptance by the widest possible audience. It is, therefore, able to meet the discrepant needs of organizations needing maximum security versus those that require maximum flexibility and convenience. Whereas some organizations will want to control use at the policy level, others will want to grant maximum control to the workstation users. Where some organizations will wish to allow only encrypted data communication, others will wish to require encryption only for certain information shared with external organizations with whom a cryptographic relationship has been established. To meet these seemingly dichotomous requirements, the CKM-NIC application is built on a system of multi-level defaults and over-rides.

Domain-Credential Mapping

Functionally, the CKM-NIC system rests on mapping credentials to IP domains. Once established, this mapping determines whether or not any two PCs may use CKM-Encryption in their communications and what credentials to use by default.

Domain-Credential Mapping establishes a cryptographic relationship between computers with CKM-Enabled NICs in any one domain with all other similarly configured computers in the same or other domains. Specified domains are linked to an algorithm and one or more credentials. Depending on certain organizational policies (see below), this algorithm and credential set serve either as the default or required credentials used to encrypt data sent to any PC within that domain.

For example, Acme Corporation might establish a cryptographic relationship with Apex, Incorporated (through each company's Policy Manager). Acme would then add Apex to its Domain-Credential Map by linking the domain apex.com to the $P^2$ Stream Mode algorithm and the following credentials:

| Index | Category | Credential Name |
|-------|----------------|---------------------|
| 1 |  | Domain Split |
| 4 | Classification | Sensitive |
| 7 | Service | Product Development |

Once established and distributed to end-user workstations, this combination of algorithm and credentials would be applied, by default, to all IP communications between any workstation in the Acme domain and any workstation in the Apex domain.

Domain-Credential Maps will be maintained either in a map file, the Windows Registry, or in a proprietary data store. At each organization's discretion, mappings may be established by any person or group central in the domain (e.g., security administrator, network administrator, CKM Policy Manager). Since the mapping does not contain key splits or other keying material, its security requirements are minimal. It may, therefore, be distributed via E-mail or download without special concern. Nevertheless, to prevent unauthorized modifications, the map will be encrypted using an internal key unavailable to users.

User Credentials

In all CKM systems, each user is provided with the credentials and algorithms that he or she may use for encryption and decryption. The credentials, along with their related key splits, are maintained with the names of available algorithms and enforced policy in the user's Credential Store. At the discretion of each organization, the Credential Store is kept on a Smart Card, floppy disk, hard drive, or network directory, and serves as the user's token in the CKM system.

Regardless of which credentials are specified in the Domain-Credential Map, encryption or decryption will be successful only if the required credentials exist in the user's Credential Store. The key splits necessary to encrypt or decrypt information exist only in the user's Credential Store. For encryption, the CKM Driver attempts to retrieve the splits specified in the Domain-Credential Map. If the splits are not available in the user's Credential Store, data transmission is terminated. Upon reception of encrypted data, the CKM Driver determines the credentials required to decrypt data from a header contained at the beginning of the first data packet. If the splits for these credentials are not found in the user's Credential Store, CKM will be unable to generate the key needed to decrypt the data. In this case, the data is destroyed and an error message returned to the front-end application.

Overriding Default Domain Credentials

The Domain-Credential Map allows maximum transparency of the cryptographic system. It allows users to continue to work as they already do, with no concern for how or if their data is being encrypted.

In many situations, however, the default credentials provided by the map may serve only as a general template that should be refined for different types of information and when communicating with different users. For example, communications between PCs within a single domain are likely to be mapped only to the Domain Split. Salary information shared between the Human Resources department and divisional managers likely calls for credentials that restrict access to most employees. In some organizations it is, therefore, important that users be able to add credentials prior to transmitting.

If the organization's policy permits, users are able to add to default credentials in one of two ways:
1. Session Override—In the CKM Session Window, the user will be able to add to the credentials used for each domain for the remainder of the session. The new, more restrictive credentials will remain in effect either until the user terminates the CKM session or until he or she changes them again.
2. Connection—If the user has elected to display a confirmation each time a connection is established with a domain, he or she will be able to further restrict the credentials used for the remainder of the connection.

If permitted by policy, users may also change the cryptographic algorithm used for the remainder of either the session or the connection. In this case, users will be able to select any algorithm provided in their credential set, whether considered more or less restrictive than the one in the map.

Additionally, if the organization's policy permits, custom applications will be able to add to default credentials or select a different algorithm. When the algorithm and credential are provided by an application, they are applied only for the current connection.

Domain Policy

CKM provides the ability for each domain to establish policy controlling the use of CKM. For example, domains may establish policies regarding the length and format of logon passwords and credential storage locations.

In a CKM system, policy is established by the Domain's Policy manager (typically through the CKM-Policy Manager software) and distributed to users through their Credential Managers. If desired, the Policy Manager may allow Credential Managers to further restrict or modify any policy. Once distributed to end users as part of their Credential Stores, the CKM Driver enforces all policies.

Domain Exclusivity

This policy determines what happens when a user contacts a workstation in a domain that is not included in the Domain-Credential Map. Values for this policy are as follows:
  Allow Unencrypted Communication With Any Domain—allows the user to over-ride the use of any encryption to any domain, whether or not the receiving workstation is CKM-enabled.
  Require Encryption When Possible—if the receiving domain is included in the Domain-Credential Map, all data is sent encrypted and the user may not elect to over-ride the use of encryption. If, however, the receiving domain is not included, data will be transmitted and received in the clear, automatically, with no user intervention. This option will be useful for many organizations that do not wish to limit communications only to domains that use CKM-NIC encryption (such as most sites on the World Wide Web), but that do want to protect information within their own organization and in communication with certain other organizations.
  Require Encryption Always—does not allow the transmission of unencrypted data. Depending on whether the user is allowed to add a Domain-Credential link (see below), this option will either limit communications only to domains that are included in the Domain-Credential Map, or will require the user to select credentials to use when communicating with a domain not included in the map. In either case, data sent to a PC that is not equipped with a CKM-enabled NIC will be unusable.

Adding Domain-Credential Links

This policy determines whether users are able to add Domain-Credential Links either temporarily or permanently. This policy is used only when Domain Exclusivity is set to Require Encryption Always. Values for this policy are as follows:
  Never—User may not add Domain-Credential Links
  This Connection—User may add a Domain-Credential Link for the current connection. The link will be terminated when the connection is broken.
  Persistent—User may add a Domain-Credential Link to his or her copy of the Domain-Credential Link Map. Once added, the domain will be treated as any other domains included in the map.
  If users are allowed to add Domain-Credential Links, they may apply any credential available in their own Credential Set.

Credential Selection by Users

This policy determines if users are permitted to select credentials in addition to those provided in the Domain-Credential Map. This policy affects the credentials used only for those Domains included or added to the map. Values for this policy are as follows:
  Never—User may not modify the credentials provided in the Domain-Credential Map. When this value is in effect, the links in the Domain-Credential Map are used as required credentials.
  This Connection—User may add credentials to those provided in the Domain-Credential Map for the current connection only. The Domain-Credential link reverts to those in the map the next time a connection with the domain is established. This policy is useful only if Credential Confirmation is displayed.

This Session—User may add credentials to those provided in the Domain-Credential Map for the remainder of the session. If this value is active, the user may further restrict the credentials for any domain through the CKM-Session Window. The modified credential links remain active until the user modifies credentials again or until the CKM session terminates.

If users are permitted to modify Domain-Credential Links, they may add any credential available in their own Credential Store.

Algorithm Selection by Users

This policy determines if users are permitted to select an algorithm other than that specified in the Domain-Credential Map. If permitted, users will be able to apply any algorithm available in their own Credential Set. Values for this policy are the same as those for Credential Selection by Users, above.

Credential Selection by Applications

This policy determines whether credentials, in addition to those specified in the Domain-Credential Map, may be applied through the CKM Driver's Application Programmer's Interface (API). If permitted, custom applications may select credentials based on their own needs and logic. Values for this policy are as follows:

Never—Applications may not modify the credentials provided in the Domain-Credential Map. When this value is in effect, the links in the Domain-Credential Map are used as required credentials.

This Connection—Applications may apply credentials in addition to those provided in the Domain-Credential Map for the current connection only. The Domain-Credential link reverts to those in the map the next time a connection with the domain is established. This policy is useful only if Credential Confirmation is displayed.

If permitted, applications will be able to apply only those credentials available in the user's Credential Store.

Algorithm Selection by Applications

This policy determines whether the encryption algorithm may be selected through the CKM Driver's Application Programmer's Interface (API). If permitted, custom applications may select algorithms based on their own needs and logic. Values for this policy are the same as those for Credential Selection by Applications, above.

The present invention has been described by way of example and in terms of preferred embodiments. However, it is to be understood that the present invention is not strictly limited to the disclosed embodiments. To the contrary, various modifications, as well as similar arrangements, are included within the spirit and scope of the present invention. The scope of the appended claims, therefore, should be accorded the broadest possible interpretation so as to encompass all such modifications and similar arrangements.

What is claimed is:

1. A method of providing a secure network packet, said method comprising:
   generating a working key;
   encrypting, based at least in part on said working key, target data;
   binding together a plurality of key splits to form a cryptographic key;
   encrypting, based at least in part on the cryptographic key, said working key; and
   forming the secure network packet including the encrypted target data and the encrypted working key;
   wherein said plurality of key splits includes a domain key split and a user key split.

2. The method of claim 1, wherein the working key is generated randomly or pseudo-randomly.

3. The method of claim 1, wherein the secure network packet is provided at least in part by an integrated circuit.

4. The method of claim 1, wherein the secure network packet is provided at least in part by a network interface device.

5. The secure network packet provided by the method of claim 2.

6. The method of claim 1, further comprising extracting at least one of said plurality of key splits from a credential store.

7. The method of claim 1, wherein at least one of said plurality of key splits is a default key split.

8. The method of claim 1, wherein at least one of said plurality of key splits is selected by a user.

9. The method of claim 1, wherein at least one of the target data and said working key is encrypted according to a default cryptographic algorithm.

10. The method of claim 1, wherein at least one of the target data and said working key is encrypted according to a user selected cryptographic algorithm.

11. A method of accessing encrypted target data encapsulated by a secure network packet, comprising:
    parsing the secure network packet to provide the encrypted target data and an encrypted working key;
    binding together a plurality of key splits to form a cryptographic key;
    decrypting, based at least in part on the cryptographic key, the encrypted working key; and
    decrypting, based at least in part on the decrypted working key, the encrypted target data to provide decrypted target data;
    wherein said plurality of key splits includes a domain key split and a user key split.

12. The method of claim 11, wherein the secure network packet is accessed at least in part by an integrated circuit.

13. The method of claim 11, wherein the secure network packet is accessed at least in part by a network interface device.

14. The decrypted target data and the cryptographic key provided by the method of claim 11.

15. The method of claim 11, further comprising extracting at least one of said plurality of key splits from a credential store.

16. The method of claim 11, wherein at least one of said plurality of key splits is a default key split.

17. The method of claim 11, wherein at least one of said plurality of key splits is selected by a user.

18. The method of claim 11, wherein at least one of the encrypted target data and the encrypted working key is decrypted according to a default cryptographic algorithm.

19. The method of claim 11, wherein at least one of the encrypted target data and the encrypted working key is decrypted according to a user selected cryptographic algorithm.

* * * * *